United States Patent [19]

Wieg

[11] 3,757,423

[45] Sept. 11, 1973

[54] MEASURING APPARATUS
[75] Inventor: Heinrich J. Wieg, Dayton, Ohio
[73] Assignee: The Bendix Corporation, Southfield, Mich.
[22] Filed: Oct. 19, 1970
[21] Appl. No.: 81,992

[52] U.S. Cl. .............. 33/174 R, 33/1 M, 33/172 R, 33/189
[51] Int. Cl. ......................... G01d 5/00, G01b 3/28
[58] Field of Search ................. 33/189, 191, 169 C, 33/1 M, 172 R, 172 D, 147 R, 174 P; 335/245

[56] References Cited
UNITED STATES PATENTS

| 2,212,306 | 8/1940  | Schwartz | 33/172 R |
| 3,199,201 | 8/1965  | Minix    | 33/172 R |
| 3,239,939 | 3/1966  | Aller    | 33/174 P |
| 3,241,243 | 3/1966  | Speer    | 33/189   |
| 3,578,746 | 5/1971  | Walker   | 33/174 P |
| 3,108,380 | 10/1963 | Arnaud   | 33/189   |
| 3,177,585 | 4/1965  | Brown    | 33/1 M   |
| 3,384,970 | 5/1968  | Avalear  | 33/189   |
| 3,571,934 | 3/1971  | Buck     | 33/169 R |
| 2,922,614 | 1/1960  | Nickells | 335/245  |

Primary Examiner—William D. Martin, Jr.
Assistant Examiner—Milton S. Gerstein
Attorney—Joseph V. Tassone, William F. Thornton and Plante, Hartz, Smith & Thompson

[57] ABSTRACT

A machine for and method of providing dimensional measurements are provided and such machine has a carrier which is freely movable substantially in one plane and the carrier supports an elongated support for movement transverse such plane. The elongated support carries a gaging device at its lower end which enables rapid positioning of the carrier and support upon engagement thereof against an associated workpiece. The device has an outer housing and a shaft which is supported for precisely controlled telescoping movement within such housing and the shaft is provided with a gaging probe at its outer end. The shaft and gaging probe have a mass and combined length which is small compared to the mass and length of the elongated support enabling rapid retraction of the gaging probe against an associated stop using inexpensive retractable means comprising such device. The small mass of the shaft and probe also assure that the probe may be yieldingly urged by associated urging means against an associated workpiece with a precisely controlled force to thereby assure such workpiece will not be damaged.

10 Claims, 6 Drawing Figures

PATENTED SEP 11 1973    3,757,423
SHEET 1 OF 2
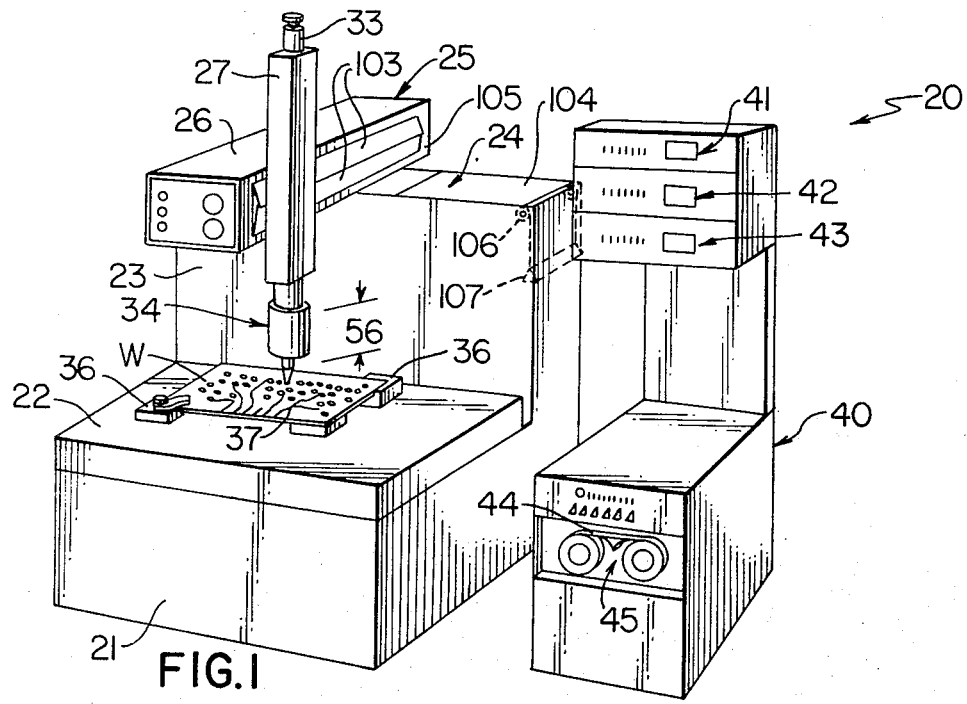
FIG.1
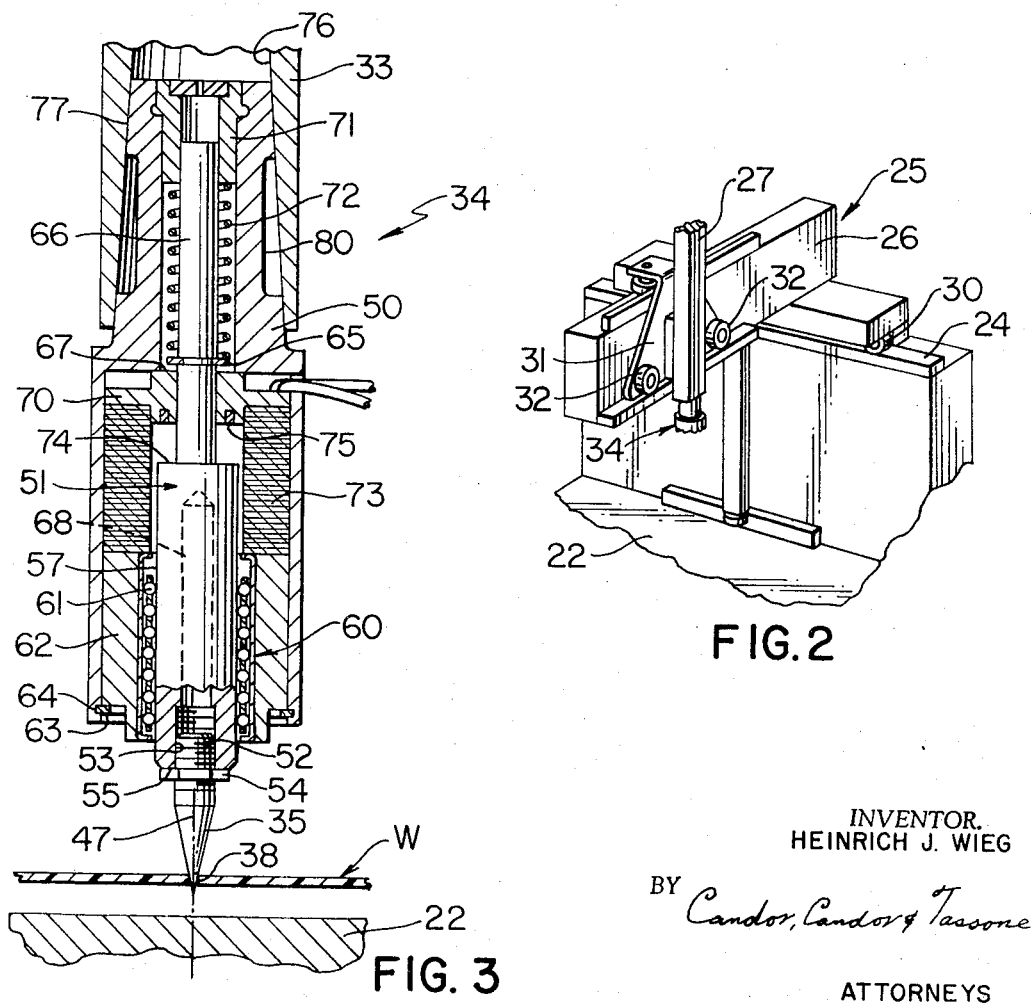
FIG.2
FIG.3
INVENTOR.
HEINRICH J. WIEG
BY Candor, Candor & Tassone
ATTORNEYS

MEASURING APPARATUS

BACKGROUND OF THE INVENTION

There are numerous measuring machines in current use which are used to provide dimensional measurements of workpieces relative to a plurality of reference axes such as mutually perpendicular X and Y axes arranged in a horizontal plane, for example. Many of these present machines have carriers which are supported for substantially antifriction movement in a roughly horizontal plane and in a particular machine its carrier is usually arranged parallel to and above a horizontal worktable and to assure accuracy during measurement such carrier supports an elongated vertically arranged support or rod of large length and mass which has a gaging probe fixed to its lower end. However, in measuring the locations of the centers of openings in a workpiece in an X-Y plane, for example, where the workpiece is made of a comparatively soft or easily damaged material, it has been found that it is very difficult to maintain the downwardly unbalanced force exerted by the probe carried by such an elongated support to a value which is small enough to prevent damage to such workpiece and/or enlargement of the openings. Further, because of the comparatively large mass of such an elongated support it is very difficult to retract the gaging probe rapidly and thereby enable rapid positioning in a serial manner over a plurality of openings which are to be checked or gaged for locations. In addition, with an elongated support of large mass used on present measuring machines it is necessary to move the support and gaging probe slowly toward the workpiece to assure such workpiece is not damaged. Thus, present measuring machines are deficient in that each of such machines requires comparatively long time periods to position its gaging probe against a workpiece to be measured and to retract such probe for repositioning thereof to another gaging location.

SUMMARY

This invention provides an improved measuring machine and a gaging device comprising such machine which is of simple and economical construction and enables rapid and efficient measuring of workpieces without damage thereto; and, this invention also provides an improved method of measuring.

The measuring machine has a carrier which is freely movable substantially in one plane and the carrier supports an elongated support for movement transverse such plane. The elongated support carries a gaging device at its lower end which enables rapid positioning of the carrier and support upon engagement thereof against an associated workpiece. The device has an outer housing and a shaft which is supported for precisely controlled telescoping movement within such housing and the shaft is provided with a gaging probe at its outer end. The shaft and gaging probe have a mass and combined length which is small compared to the mass and length of the elongated support enabling rapid retraction of the gaging probe against an associated stop using inexpensive retracting means comprising such device. The small mass of the shaft and probe also assure that the probe may be yieldingly urged by associated urging means against an associated workpiece with a precisely controlled force to thereby assure such workpiece will not be damaged.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which FIG. 1 is a perspective view illustrating one exemplary embodiment of a measuring machine which has the gaging device of this invention provided as a part thereof;

FIG. 2 is a perspective view with parts broken away illustrating means supporting a carrier comprising the machine of FIG. 1 for movement in a substantially horizontal plane;

FIG. 3 is an enlarged cross-sectional view of one exemplary embodiment of the gaging device of this invention which may be used on the machine of FIG. 1;

DESCRIPTION OF ILLUSTRATED EMBODIMENTS

Figure 4:
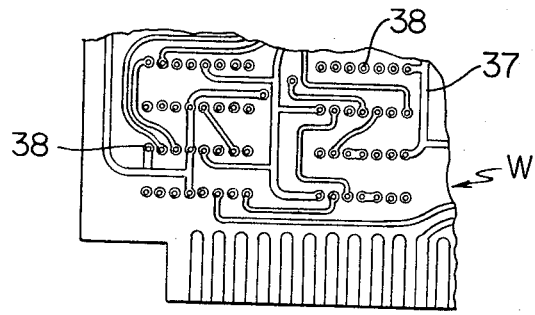
FIG. 4 is a fragmentary plan view illustrating an exemplary workpiece in the form of a printed circuit board which may be measured using the apparatus of FIG. 1.

Reference is now made to FIG. 1 of the drawings which illustrates an exemplary measuring machine in the form of a numerically controlled measuring machine 20 which uses one exemplary embodiment of the device of this invention. The machine 20 has a base 21 which supports a worktable 22 and the base 21 has an upstanding portion 23 which has horizontal ways 24, see FIG. 2, which support a carriage assembly 25 for horizontal movement along an axis popularly referred to as the X axis. The carriage assembly 25 supports a beam 26 which in turn supports a carrier 27 for horizontal movement on such beam and along an axis which is popularly referred to as the Y axis and is perpendicular to the X axis. The carriage assembly 25 has a plurality of wheels or rollers 30 which support it for easy movement along ways 24 and the carrier 27 is supported for horizontal movement along beam 26 using a roller device 31 having wheels or rollers 32. Thus, the carrier 27 is freely movable substantially in one plane which, in this example, is a horizontal plane.

The carrier 27 supports a rigid elongated rod-like support or member 33 for vertical movement along an axis popularly referred to as the Z axis and using any suitable bearing means and holding means and to assure that the lower end of member 33 does not deflect or otherwise move in a direction transverse its vertically arranged longitudinal axis whereby member 33 has a comparatively large mass. The carrier 27 has a substantial vertical height or length which assures that the member 33 is supported along a substantial portion of its vertical height.

The machine 20 has a gaging device which is designated generally by the reference numeral 34 and is supported by member 33 at the lower end thereof and the device 34 will be described in detail subsequently. The device 34 has a conical gaging probe 35 extending therefrom and such probe is particularly adapted to engage a workpiece W which is supported on the worktable 22 by a fixturing apparatus comprised of a plurality of cooperating component parts each designated by the same reference numeral 36.

The workpiece W of this example is shown as an electrical printed circuit board, also see FIG. 4, which may be made of a suitable plastic-like material such as an epoxy resin having metal conductors 37 suitably fixed thereon and having a plurality of openings, each designated by the same reference numeral 38, provided therein. The openings 38 must be precisely formed to receive cooperating members such as pins of electrical components and hence must be checked without enlarging openings 38 or otherwise damaging the circuit board or workpiece W.

The machine 20 has a control console 40 which is suitably operatively connected to the main portion of such machine and the console 40 has a display panel which may include suitable indicating means shown at 41 for indicating the vertical position of the probe 35 and hence its position from a reference point along the Z axis, indicating means shown at 42 for indicating the position of the probe 35 from such reference point and along the X axis, and indicating means shown at 43 for indicating the position of the probe 35 from such reference point and along the Y axis. The indicating means may be of any suitable known construction and usually comprise lighted members. The machine 20 also has sensing means (not shown) of known construction operatively associated with the gaging device 34 for sensing the exact position thereof and hence the exact position of its probe 35. The indicating means of machine 20 are connected by a suitable electronic system to the sensing means; and, the sensing means and indicating means automatically sense and indicate a change of position of the gaging device 34 and hence its probe in inches and decimal parts of an inch to high accuracies which depend upon the application of the machine 20 and often provide accuracies within ± 0.0001 inch of true position and even greater accuracies.

As previously mentioned, the carriage assembly 25 is supported for movement on ways 24 while the carrier 27 is supported by the roller device 31 for movement along the beam 26. Inasmuch as the machine 20 is a numerically controlled machine it is provided with suitable moving means (not shown) which provide automatic movement of the assembly 25 and carrier 27.

The moving means may be operated to move carrier 27 and member 33 and hence gaging device 34 and its contact probe 35 under command from programming means provided in the control console 40. The programming means may be in the form of magnetic tape, punched tape, punched card, or the like, and in this example is in the form of a punched tape 44 provided in a conventional tape head 45. The machine 20 has an electrical system of known construction which commands the moving means for the gaging device 34 to automatically position the gaging probe 35 immediately above the theoretical center position of an opening 38, see FIG. 4, in the workpiece W which is to be checked whereupon the device 34 of this invention is actuated, causing the gaging probe 35 to be extended, in a manner to be described in detail subsequently, within the opening 38.

The carriage assembly 25 and carrier 27 are freely movable whereby once the conical gaging probe 35 is extended into an opening 38 being checked the probe 35 serves to automatically position the carrier 27 and carriage assembly 25 so that the vertical axis 47 of the probe coincides with the center of the opening 38. The actual position of the opening 38 is then indicated on the indicating means 42 and 43 to thereby indicate the position of the opening 38 in the X-Y plane, for example. The probe 35 may then be automatically retracted and moved under tape command to the theoretical position of the center of another opening 38 provided in the workpiece W which is to be checked whereupon the probe 35 is again automatically extended to provide the self-centering action which automatically positions the probe 35 so that its vertical axis 47 again coincides with the actual center of the other opening 38 being checked and its exact position is indicated in a similar manner as previously. Because the carrier 27 is freely movable along the beam 26 and the carriage assembly 25 is freely movable along ways 24, the self-centering action is provided by the gaging probe 35 with a minimum amount of force and typically in the measuring machine 20 such self-centering may be provided with a force of roughly three or four ounces.

However, it will be appreciated that it is important that the gaging probe 35 should not be urged against the workpiece W with an excessive amount of force because such urging would cause damage to the workpiece W and possible enlargement of the openings 38 therein. Basically this is one of the major problems with measuring machines in present use because each of these machines uses a comparatively massive vertically movable member having a gaging probe provided at its lower end. As previously mentioned, each of the present machines is difficult to control in the amount of gaging force that its vertically movable member and probe exert on a workpiece, requires an excessive amount of time to assure that such member has finally settled to its gaging position, and requires comparatively complicated and expensive moving means to position such member vertically. However, the gaging device 34 avoids these problems, as will be readily apparent from the following description.

The gaging device 34 has a housing 50, see FIG. 3, which supports a shaft 51 for telescoping movement and the conical probe 35 has an upper threaded portion 52 threadedly connected in a threaded opening 53 provided in the lower end of such shaft. A lock nut 54 is threaded on the threaded portion 52 of probe 35 and against a lower annular surface 55 of the shaft 51 to firmly lock the probe 35 in position. The shaft 51 with the gaging probe 35 fixed to the lower end thereof has a mass and axial length which is small compared to the mass and axial length of the member 33; and, the axial length of shaft 51 and probe 35 is indicated at 56 in FIG. 1 and readily compared with the overall length or height of member 33.

The shaft 51 has a comparatively larger diameter lower portion 57 which is supported by an antifriction bearing assembly 60 for precise substantially antifriction vertical movement while assuring that the shaft 51 and gaging probe 35 are not moved or deflected transverse the vertical axis 47 of such probe. The bearing assembly 60 is in the form of a ball bushing having ball bearings 61 which are held in a pre-loaded manner against the outside surface of the lower portion 57 and the bearing assembly 60 is held firmly in position in the housing 50 by a bearing retainer 62. The retainer 62 may be lightly pressed in the housing 50, and a snap ring 63 may also be inserted within a cooperating annular groove 64 in the housing 50 to assure that the bearing retainer 62 is held in position.

The shaft 51 has another ring, also shown as a snap ring 65, fixed thereto and the snap ring 65 is received in a groove provided in the upper portion 66 of the shaft 51; and, the ring 65 is particularly adapted to engage the top surface 67 of a stop ring 70 which is suitably fixed in the housing 50. A sleeve bearing 71 is also provided and fixed in the upper portion of the housing 50 and the sleeve bearing 71 supports the upper portion 66 of the shaft 51 radially while allowing free vertical sliding movements of shaft 51.

The gaging device 34 also has means in the form of a compression spring 72 for urging the shaft 51 and hence the gaging probe to an extended or outward position. The compression spring 72 acts between the bottom annular surface of the sleeve bearing 71 and the top surface of the snap ring 65 to urge the shaft 51 outwardly until the bottom surface of snap ring 65 engages the top surface 67 of the stop ring 70.

Thus, the shaft 51 and hence the gaging probe 35 is urged outwardly to an extended position in a controlled manner by a precisely controlled unbalanced downward force of small magnitude which is determined by the comparatively light weight of members 51 and 35 and the force exerted by the compression spring 72 whereby the force which the gaging probe 35 exerts against the workpiece W is kept at a minimum. Also, to assure that the weight of the member or shaft 51 is kept at a minimum a lightening hole 68 is provided in its lower portion 57. The only force resisting outward movement of the probe is a frictional force tending to hold to shaft 51 upwardly; however, such frictional force is kept at a controlled minimum through the use of the bearing assembly 60.

The device 34 has means for retracting the shaft 51 and the gaging probe 35 within housing 50 and in this exemplary embodiment such retracting means is in the form of an electric solenoid 73 of conventional construction which is energized using alternating current. The solenoid serves to retract the shaft until a top annular surface 74 of its lower portion 57 engages the lower surface of a ring 75 which is fixed in an embedded manner within the stop ring 70. The ring 75 is made of a material having high electrical conductivity and once the top surface 74 is urged thereagainst the magnetic flux path is in an optimum condition whereby the solenoid 73 may be kept actuated for substantial periods with minimum likelihood of heating.

The gaging device 34 may be fastened to the elongated member 33 using any suitable technique which enables quick attachment and detachment thereof. In this example of the invention the member 33 has a substantially frustoconical female surface 76 defined in its lower end portion and the housing 50 is provided with a cooperating substantially frustoconical surface 77 interrupted by a central annular cutout 80 whereupon the device 34 may be rapidly attached or fixed in position in a manner known in the art by wedging the outside surface 77 against the inside frustoconical surface 76 and may be rapidly detached from member 33 by lightly tapping the device 34 downwardly.

During operation of the machine 20, the solenoid 73 is energized to retract the shaft 51 and probe 35 whereupon the carrier 27 and hence probe 35 are then suitably positioned over an opening 38, the exact position of which is to be measured. The solenoid 73 is then de-energized, allowing the compression spring and the weight of the shaft 51 and probe 35 to urge such probe rapidly into position in a precisely controlled manner and inasmuch as the overall mass of the shaft 51 and probe 35 is comparatively small, there is little likelihood of enlarging an opening 38 or otherwise damaging the workpiece W.

In particular, it has been found that the probe 35 is usually in a stable or settled position within a small fractional part of a second and exerts an adequate and safe gaging force of roughly eight ounces or less against the workpiece. This is in contrast to unbalanced downward forces of 1-½ pounds and more exerted by gaging probes of presently used machines.

Because the technique employed by the gaging device of this invention merely requires retraction of the shaft carrying the gaging probe against a stop such retraction may be achieved with optimum rapidity using the high speed retraction characteristic of the AC solenoid 73 in this embodiment of the invention. In addition, with this invention the gaging probe 35 is only retracted the required amount, which further reduces the operating cycle time and for an electrical printed circuit board having openings of roughly one-eighth inch diameter therein which are to be checked the typical gaging device 34 would be designed to retract roughly one-fourth inch. However, it will be appreciated that the travel of a shaft 51 and hence a gaging probe 35 may be made any amount, depending upon the application of this invention and may be either less than the one-fourth inch mentioned or may be generally of the order of several inches.

Figure 5:
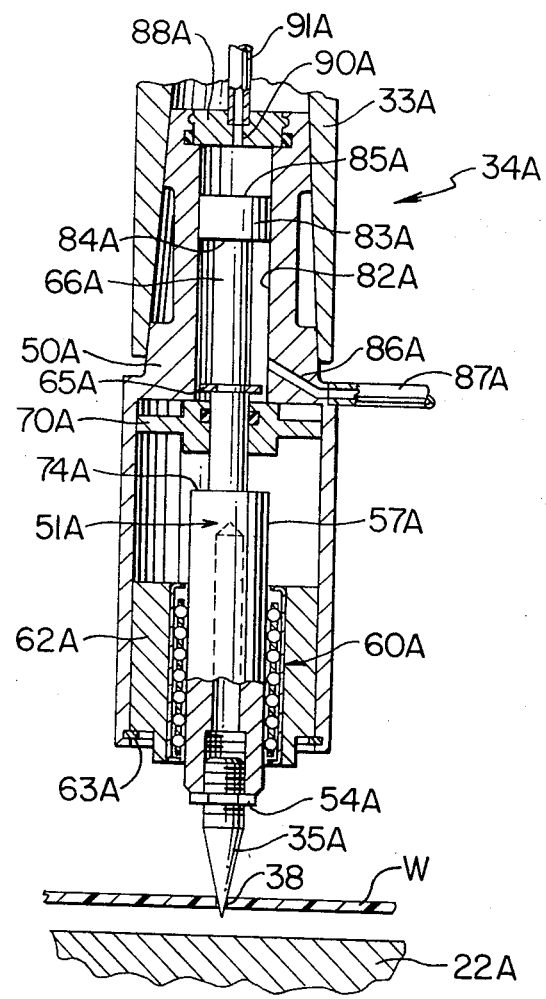
FIg. 5 is a cross-sectional view similar to FIG. 3 illustrating another exemplary embodiment of the gaging device.

Another exemplary embodiment of a gaging device of this invention is illustrated in FIG. 5 of the drawings. The device illustrated in FIG. 5 is very similar to the device 34; therefore, such device will be designated generally by the reference numeral 34A and parts of the device 34A which are similar to corresponding parts of the device 34 will be designated by the same reference numerals as in the device 34, also followed by the letter designation A and not described again. Only those component parts of the device 34A which are different from the device 34 will be designated by a new reference numeral also followed by the letter designation A and described in detail.

The device 34A differs from the device 34 primarily in the fact that it is urged outwardly by a fluid under pressure rather a mechanical spring. In addition, instead of being normally held in an extended or outwardly urged position the device is preferably normally held inwardly or in a retracted position also by a fluid under pressure.

The device 34A has a precisely controlled cylindrical bore 82A provided in the upper portion of its housing 50A and a piston 83A is suitably fixed to the upper portion 66A of its shaft 51A. The piston 83A is supported for axial sliding movement in the bore 82A in a known manner whereby the movement of shaft 51A and gaging probe 35A is controlled by the pressure exerted against opposite surfaces 84A and 85A of the piston 83A.

In particular, the housing 50A has a passage 86A which is suitably connected to a source of fluid under controlled pressure through a conduit 87A and in a manner known in the art. The housing 50A also has an insert portion 88A at the top thereof which has a passage 90A provided therein and this passage is placed in fluid flow communication with a source of fluid under controlled pressure using a conduit 91A.

The piston 83A and hence probe 35A is retracted by supplying fluid under controlled pressure through passage 86A and against the lower surface 84A of the piston 83A, allowing positioning of the probe 35A above an opening 38 in a workpiece W in a similar manner as previously described for the device 34. Once the probe 35A is thus positioned and with a controlled pressure still being exerted against surface 84A, fluid at a precisely controlled pressure is provided through passage 90A overriding the action of the fluid against the surface 84A to thereby yieldingly urge the shaft 51A and probe 35A downwardly with a controlled force against the workpiece W whereby the probe 35A provides self-centering of the carrier associated with the gaging device 34A in a similar manner as previously described. Also, it will be appreciated that the force exerted by the gaging probe 35A may be controlled with optimum precision through the use of fluid at controlled pressures.

Figure 6:
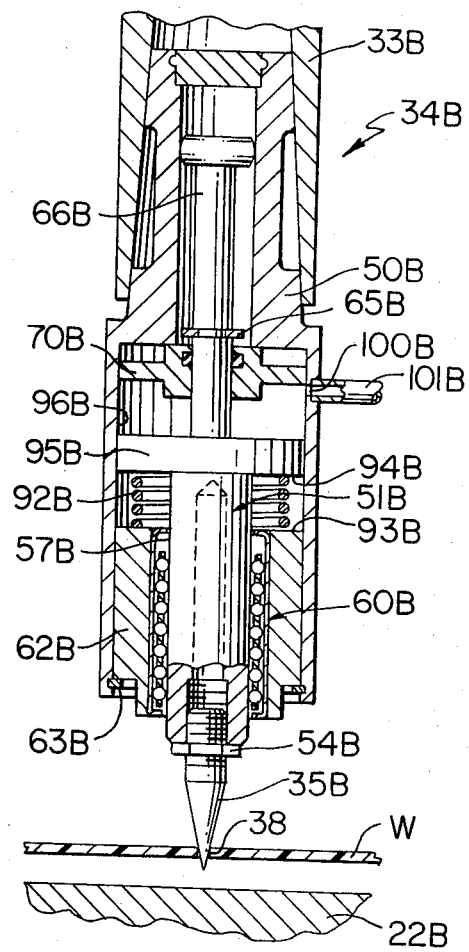
FIG. 6 is a cross-sectional view similar to FIG. 3 illustrating still another exemplary embodiment of the gaging device of this invention.

Another exemplary embodiment of a gaging device of this invention is shown in FIG. 6 of the drawings. The device of FIG. 6 is very similar to the device 34; therefore, such device will be designated generally by the reference numeral 34B and parts of the device 34B which are similar to corresponding parts of the device 34 will be designated by the same numerals as in the device 34, also followed by the letter designation B and not described again. Only those component parts which are different from corresponding parts of the device 34 will be designated by a new numeral also followed by the letter designation B and described in detail.

The main difference between the device 34B and the device 34 is that the shaft 51B and, hence, the gaging probe 35B is continuously held in a retracted position by a compression spring 92B. The spring 92B acts between a top surface 93B of the bearing retainer 62B and a lower surface 94B of a piston 95B which is fixed to the shaft 51B and is supported for sliding movement along a cylindrical bore 96B in the housing 50B.

Because the piston is continuously held in a retracted position by the spring 92B, it is merely necessary to move the piston 95B downwardly once the probe 35B has been suitably positioned over an opening 38 in a workpiece W and for this purpose fluid under pressure is provided through a passage 100B in the housing 50B and the passage 100B is connected to a suitable source of fluid under regulated pressure using a conduit 101B. Once it is desired to extend the gaging probe 35B into gaging position, it is merely necessary to supply fluid through the passage 100B overriding the action of the compression spring 92B and in a precisely controlled manner so that the force exerted by the gaging probe 35B is at a minimum, whereby the gaging probe 35B provides automatic self-centering of carrier and of the entire carriage assembly associated therewith in a similar manner as previously described.

Although fluid has been mentioned in general as being used in connection with the devices 34A and 34B, it will be appreciated that air under precisely controlled regulated pressure is preferably used and inasmuch as conventional techniques well known in the art may be provided for supplying air to these gaging devices, the air pressure regulators, valves, supply sources, etc., have not been shown. It will also be appreciated that the solenoid 73 provided in the gaging device 34 is also provided with electrical power from any suitable source in a manner well known in the art. Also, the entire machine 20 is provided with electrical power in a conventional manner to operate its control system, its moving means used to automatically move the carrier 27 by tape command to reference positions and to the various nominal positions above openings to be checked, its position indicating system, etc.

To assure that the roller devices supporting the carrier 27 for movement along beam 26 are protected in a dust-free manner, a pair of dust shields 103, see FIG. 1, may be provided in an overlapping manner along one side of the cover 105 for the beam 26 and slide assembly 25 and in a manner well known in the art. Similarly, a pair of dust shields 104 may be suitably attached to the cover 105 and each shield 104 may move over an associated roller 106 supported on the supporting structure for the machine 20 and may have a weight 107 at its lower end to assure that the shield 104 provides the desired protection while moving in an unobstructed manner.

Each of the gaging devices 34A and 34B may be used on the machine 20 in lieu of the device 34 merely by making available air under regulated pressure for use with each device 34A or 34B. It will also be appreciated that even though gaging devices 34, 34A, and 34B have been described as being used on a measuring machine in the form of a numerically controlled measuring machine wherein the associated gaging device and its probe is positioned by automatic control means to nominal positions, such gaging devices and the method of this invention may be used in machines where the gaging probe may be manually positioned to nominal positions whereupon the exact position or location of an opening, surface, or the like, which is to be measured precisely will be indicated in a similar manner as described previously and such position may be from any suitable reference position.

The gaging probe of each gaging device 34, 34A, and 34B has been presented as a frustoconical probe which is used in measuring the exact position of holes or openings 38 in a workpiece in the form of a printed circuit board. However, it will be appreciated that such probe may have any desired configuration and may be used to measure the exact position and configuration of surfaces, projections, and the like, depending upon the gaging application.

While present exemplary embodiments of this invention, and methods of practicing the same, have been illustrated and described, it will be recognized that this invention may be otherwise variously embodied and practiced within the scope of the following claims.

What is claimed is:

1. A machine for providing dimensional measurements of a workpiece comprising a base having an upstanding portion provided with horizontal ways, a carriage assembly which is supported on said horizontal ways for free movement along a horizontal axis, a beam supported by said carriage assembly, a carrier, means supporting said carrier for free movement on said beam along another horizontal axis which extends transverse to said first-named axis, said carriage assembly and supporting means supporting said carrier so that an arbitrary point on said carrier moves in a horizontal plane, an elongated support carried by said carrier, a gaging device having a housing detachably fastened to said elongated support with said housing having a free lower end, a shaft supported within said housing for telescoping vertical movement and having an outer end arranged outwardly of said free end, said shaft having a gaging probe provided at said outer end, said shaft with said probe having a combined mass and axial length which is a small fractional part of the mass and axial length of said support, means for urging said gaging probe with a controlled force outwardly of said free end against a surface of said workpiece which is to be measured, sensing means operatively associated with said gaging device for sensing the exact position of said probe and hence said surface, indicating means connected to said sensing means for indicating said exact position and means for retracting said shaft and probe against a stop within said housing, said carrier with said probe retracted being adapted to be roughly positioned over said surface and said probe urged outwardly of said free end against said surface with said controlled force and in a non-yielding manner, said small mass and axial length assuring said probe is urged by said urging means against said surface with said precisely controlled force which is sufficient to enable said carrier and probe to be automatically moved due to the action of said surface against said probe yet without damage to said surface.

2. A machine as set forth in claim 1 and further comprising an antifriction bearing assembly supporting said shaft for precise longitudinal vertical movements while assuring said shaft does not move in a direction transverse its longitudinal axis and means for detachably fastening said gaging probe to the terminal outer end of said shaft.

3. A machine as set forth in claim 1 wherein said antifriction bearing assembly comprises a preloaded ball bushing.

4. A machine as set forth in claim 1 wherein said urging means comprises a mechanical compression spring.

5. A machine as set forth in claim 1 wherein said retracting means comprises an electric solenoid.

6. A machine as set forth in claim 1 wherein said shaft has a lightening hole provided therein to further reduce its mass.

7. A machine as set forth in claim 1 in which said urging means comprises a fluid operated piston.

8. A machine as set forth in claim 7 in which said retracting means comprises a mechanical compression spring.

9. A machine as set forth in claim 1 in which said retracting means comprises a mechanical compression spring.

10. A machine as set forth in claim 1 and further comprising a piston fixed to said shaft and being slidably received in a cooperating bore in said housing, said retracting means comprising first conduit means supplying air under pressure to one side of said piston and said urging means comprising second conduit means supplying air under pressure to the opposite side of said piston to override the force exerted on said piston by air supplied through said first conduit means.

* * * * *